United States Patent
Bayer et al.

(10) Patent No.: US 8,409,423 B2
(45) Date of Patent: Apr. 2, 2013

(54) METHOD FOR MACHINING WORKPIECES

(75) Inventors: Erwin Bayer, Dachau (DE); Martin Bussmann, Schwabhausen (DE); Thomas Kraenzler, Salem (DE); Albin Platz, Ried (DE); Juergen Steinwandel, Uhldingen-Muehlhofen (DE)

(73) Assignee: MTU Aero Engines GmbH, Munich (DE)

( * ) Notice: Subject to any disclaimer, the term of this patent is extended or adjusted under 35 U.S.C. 154(b) by 2500 days.

(21) Appl. No.: 11/249,701

(22) Filed: Oct. 13, 2005

(65) Prior Publication Data

US 2006/0081480 A1  Apr. 20, 2006

(30) Foreign Application Priority Data

Oct. 14, 2004 (DE) .......................... 10 2004 049 967

(51) Int. Cl.
 *B23H 7/00* (2006.01)
 *B23H 3/00* (2006.01)

(52) U.S. Cl. ........................ 205/640; 205/645

(58) Field of Classification Search .................. 205/645, 205/640
 See application file for complete search history.

(56) References Cited

U.S. PATENT DOCUMENTS

| | | | |
|---|---|---|---|
| RE26,620 E * | 7/1969 | Inoue | 204/224 M |
| 3,729,610 A * | 4/1973 | Kondo | 219/69.13 |
| 4,798,929 A * | 1/1989 | Itoh | 219/69.12 |
| 6,723,223 B2 | 4/2004 | Zaitsev et al. | 205/644 |

FOREIGN PATENT DOCUMENTS

| | | |
|---|---|---|
| WO | WO 02/086198 | 10/2002 |
| WO | WO 02/900030 | 11/2002 |

\* cited by examiner

*Primary Examiner* — Harry D Wilkins, III
*Assistant Examiner* — Zulmariam Mendez
(74) *Attorney, Agent, or Firm* — Davidson, Davidson & Kappel, LLC

(57) ABSTRACT

A method for machining workpieces provides a machining electrode, which is guided at a specific distance to the workpiece. An electrolyte is provided between the workpiece and the machining electrode, through which an operating current flows between the machining electrode and the workpiece. The operating current results from an operating voltage ($U_A$), which is produced at the machining electrode, the workpiece being connected to ground. To perform the machining procedure, the distance between the machining electrode and the workpiece is regulated and the operating voltage ($U_A$) is determined in such a way that the resulting operating current is a DC current or a pulsed DC current—i.e., the operating voltage is a DC voltage of fixed or specific dimension. A measuring voltage ($U_M$) is superimposed on the operating voltage ($U_A$) for producing the operating current. The measuring current resulting because of the application of the measuring voltage ($U_M$) is detected and the distance between the machining electrode and the workpiece is concluded from the relationship between the measuring voltage ($U_M$) and the measuring current.

10 Claims, 2 Drawing Sheets

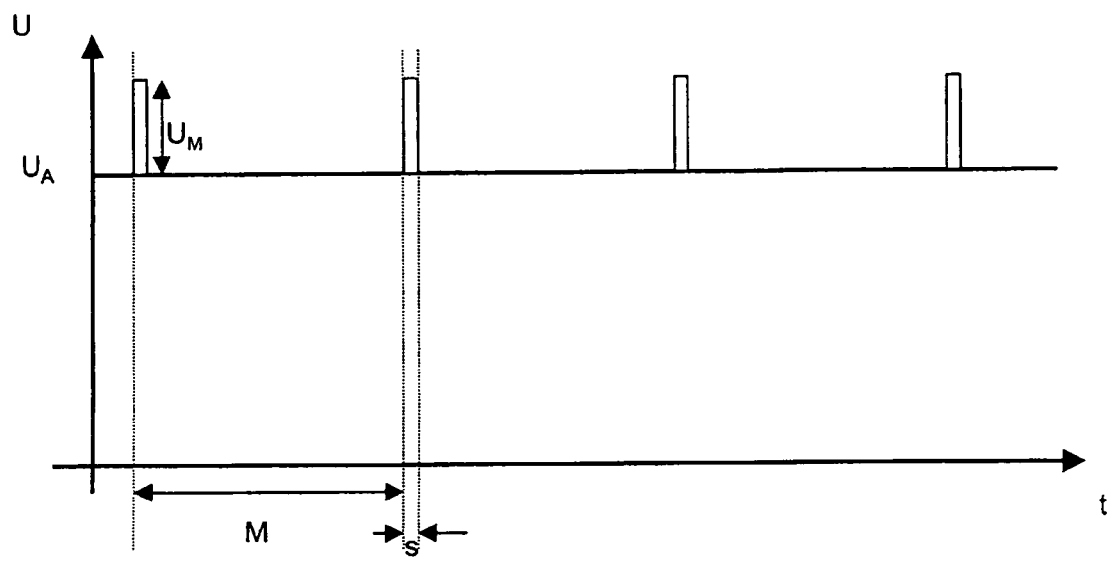
Fig.1
Fig. 2
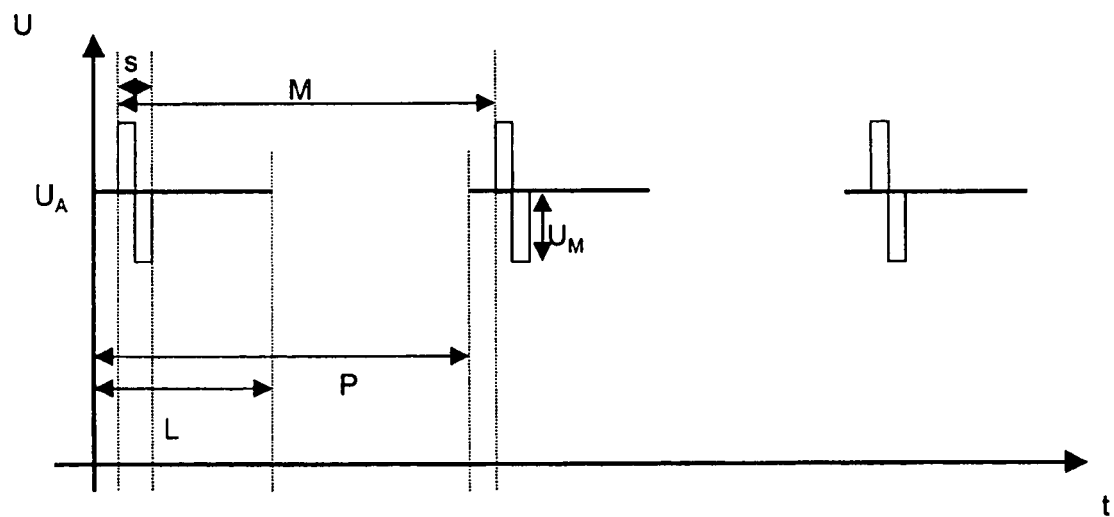

_US 8,409,423 B2_

METHOD FOR MACHINING WORKPIECES

This application claims priority to DE 10 2004 049 967.5 filed Oct. 14, 2004, the entire disclosure of which is hereby incorporated by reference.

FIELD OF THE INVENTION

The present invention relates to a method for machining workpieces in which a current flows from a machining electrode through an electrolyte to a workpiece.

Background

High precision surfaces may be produced via machining. In this case, the processing precision is a function in particular of how precisely the machining electrode is guided at the closest possible distance to the workpiece. The smaller the distance between the machining electrode and the workpiece, the smaller the zone in which an electrical field forms, and in which the current flow and the removal of material from the surface of the workpiece occur.

To ensure good processing precision, it is important that the guiding of the machining electrode in relation to the workpiece is performed with the greatest possible precision. Only in this way may a short circuit be prevented between the machining electrode and the workpiece, because the voltage has become too great for the existing distance and a voltage discharge occurs. A voltage discharge finally results in undesired surface damage occurring on the workpiece and the machining electrode also suffering damage. In order to achieve the greatest possible removal speed from the surface of the workpiece, however, the highest possible operating current, i.e., the greatest possible operating voltage between the machining electrode and the workpiece, is desired. The greater the approximation of the operating voltage to the discharge voltage, the greater the precision required for the distance regulation.

SUMMARY OF THE INVENTION

An object of the present invention is to provide a method which allows the distance between the workpiece and the machining electrode to be determined and regulated as precisely as possible in a particularly favorable way.

This object is advantageously achieved by a method according to the present invention.

A method for machining workpieces in accordance with the present invention provides a machining electrode which is guided at a specific distance to the workpiece. An electrolyte through which an operating current flows between the machining electrode and the workpiece is provided between the workpiece and the machining electrode. Operating current results from an operating voltage which is produced at the machining electrode, the workpiece being connected to ground. To perform the machining procedure, the distance between the machining electrode and the workpiece is regulated and the operating voltage is determined in such a way that the resulting operating current is a DC current or a pulsed DC current—i.e., the operating voltage is a DC voltage of fixed or specific dimension.

According to the present invention, a measuring voltage is superimposed on the operating voltage, wherein the operating voltage is the voltage applied to produce the operating current referenced above. The measuring current, which results from the application of the measuring voltage, is detected and the distance between the machining electrode and the workpiece is concluded from the relationship between the measuring voltage and the measuring current.

The brief application of a measuring voltage allows the distance between the machining electrode and the workpiece to be established, good separation between the measuring signal (measuring current) and the operating current advantageously being provided and improving the signal analysis and therefore the regulation quality. Because the measuring voltage is small in relation to the applied operating voltage, there is no danger of a short circuit. The risk of a short circuit is also kept to a minimum in that the time during which the measuring voltage is maintained is kept as brief as possible, so that the additional electrical power due to the raising of the voltage is regulated. In particular, it is possible to detect, using the measuring current, when the electrical field forming between the machining electrode and the workpiece is so strong that a further increase in the operating voltage would result in an occurrence of plasma pre-discharges, during which the charge carrier production in the electrolyte increases disproportionally. The removal intensity and therefore the processing speed are implemented optimally when the operating voltage is determined so that, at a given distance between the machining electrode and the workpiece, the boundaries of occurring plasma pre-discharges are just barely avoided. In this operating range, the operating speed is maximized at a precisely regulated distance, as is made possible by the present method.

In a preferred embodiment of the present invention, the measuring voltage is produced periodically, the periodicity of the voltage production preferably being fixed, and the periodicity particularly also being able to be dimensioned in regard to how close to the range of the plasma pre-discharges the operating conditions are selected to be. The greater the selected safety distance to the range of the plasma pre-discharges, the greater the selected periodicity for checking the distance between the machining electrode and the workpiece may be. In particular, however, it is also possible to determine the periodicity of the production of the measuring voltage as a function of the travel speed of the machining electrode. The greater the travel speed of the machining electrode in relation to the workpiece, the greater the danger that a distance given once will not be maintained and too small a distance will occur due to surface flaws of the workpiece or imprecision of the control of the travel movement, and therefore sparking will occur.

According to an advantageous embodiment of the present invention, the measuring voltage is a DC voltage, preferably of brief duration, the voltage difference between the machining electrode and the workpiece, i.e., the operating voltage, being increased by applying the measuring voltage.

According to an alternative embodiment, the measuring voltage may also be an AC voltage, in particular a sinusoidal or rectangular AC voltage. In this case, the period duration of the signal is dimensioned so that a low number of oscillation periods of voltage are contained in the measuring frequency. In a preferred embodiment, the pulse duration of the measuring voltage corresponds precisely to one voltage oscillation. The AC voltage may be a sinusoidal voltage curve, or also a triangular or rectangular voltage curve.

In a preferred embodiment of the present invention, the resulting measuring current is detected and the measuring current, which flows from the machining electrode through the electrolyte to the workpiece, is used to determine the value for the distance between the machining electrode and the workpiece. The resulting value for the distance as a function of the measuring current is derived in particular on the basis of an empirically established table, intermediate values being able to be determined via interpolation. In an advantageous refinement, the table values are established empirically, the operating voltage also being considered as a further influencing variable in establishing the values empirically.

In addition, in the method according to the present invention, the relationship resulting from the measuring voltage and the measuring current may advantageously be used for determining the distance between the machining electrode and the workpiece, and the operating voltage may additionally be fixed as a function of this relationship between the measuring voltage and the measuring current. In addition to the regulation of the distance, this allows the operating voltage to be determined in such a way that spark discharge and/or short circuit are reliably prevented and, in addition, the greatest possible operating voltage and therefore the greatest possible operating current may be used, so that the greatest possible removal speed may be achieved in this way with very high precision.

In accordance with various embodiments of the present invention, a method for machining workpieces, comprises providing a machining electrode which is guided at a specified operating distance to a workpiece, providing an electrolyte between the workpiece and the machining electrode, and providing an operating current flowing between the machining electrode and the workpiece. The operating current results from an operating voltage ($U_A$), which is produced at the machining electrode in relation to the workpiece, which workpiece is connected to ground. The operating voltage ($U_A$) being applied in such a way that the operating current is a DC current or a pulsed DC current. The method further comprises superimposing a measuring voltage ($U_M$) on the operating voltage ($U_A$), detecting a measuring current resulting from the superimposing of the measuring voltage ($U_M$), and determining a distance between the machining electrode and the workpiece from a relationship between the measuring voltage ($U_M$) and the measuring current. The method may further include regulating a position of the machining electrode relative to the workpiece based on the determined distance, such that the machining electrode is guided at the specified operating distance to the workpiece.

BRIEF DESCRIPTION OF THE DRAWINGS

The present invention is explained in greater detail in the following on the basis of the exemplary embodiments illustrated in the drawing.

FIG. 1 shows the application of the measuring voltage to the operating voltage, the operating voltage being a DC voltage;

FIG. 2 shows the voltage-time diagram which results if an AC voltage is used as the measuring voltage and a pulsed DC voltage is used as the operating voltage.

DETAILED DESCRIPTION

Figure 3:
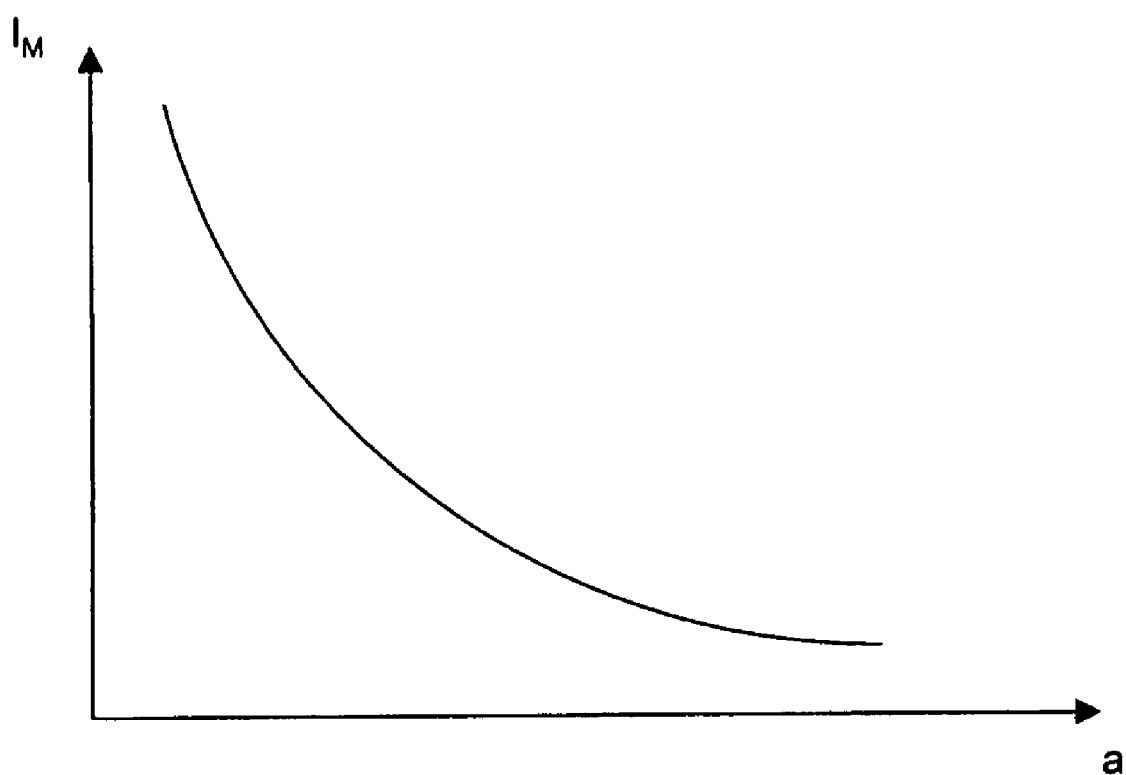
FIG. 3 shows a qualitative diagram of the relationship between the distance and measuring current $I_M$.

FIGS. 1 and 2 each show the diagram of the voltage curve over time, which is provided when performing the method according to the present invention. In the method according to the present invention, the voltage is produced at the machining electrode and the current flow resulting because of the production of the voltage is measured. The operating current resulting from the operating voltage is first filtered out of the current signal in a computer device, so that this current signal only contains the current component which is caused by the measuring voltage. This may be performed using a high-pass filter or other appropriate device, for example. Alternatively, the voltage production device for the measuring voltage can be separate from the voltage production device for the operating voltage, so that the resulting measuring current is directly measurable in the area of the voltage production device for the measuring voltage.

In any event, a corresponding value for the distance between the machining electrode and the workpiece is then derived from the measuring current. FIG. 3 shows the relationship between distance "a" and measuring current $I_M$ in qualitative form. The qualitative relationship may become a quantitatively determined relationship through calibration, for example, so that a value for the distance may be determined from the measuring current. It is apparent from FIG. 3 that the gradient of the measuring current is particularly large at small distances a and therefore allows a high measuring resolution.

FIG. 1 shows a voltage curve as is given when a DC voltage is produced as operating voltage $U_A$. Measuring voltage $U_M$ is superimposed on operating voltage $U_A$ at regular intervals of periodicity M. Signal duration "s" is as brief as possible in this case and can, for example, be in the range from 1 ms to 0.1 second.

FIG. 2 shows the identical diagram for the case in which operating voltage $U_A$ is a pulsed DC voltage, DC voltage $U_A$ being produced after each pulse duration P for a pulse length L. For distance measurement, a measuring voltage $U_M$ is applied at least once during every pulse of pulse length L. In this case, signal duration "s" of the measuring voltage is very brief in relation to time L. In particular, the measuring voltage is produced periodically with a periodicity M. Both signal duration "s" and the absolute value of measuring voltage $U_M$ may be determined as a function of periodicity M, pulse length L, and other variables, for example, in such a way that precise distance determination as well as minimal interference and undesired influence result due to the measurement.

Measuring voltage $U_M$ may be a DC voltage, as is shown in FIG. 1, as well as an AC voltage, as is shown in FIG. 2. The shape of measuring voltage $U_M$ is independent of the shape of operating voltage $U_A$. FIG. 2 shows a measuring voltage $U_M$, which is formed as a rectangular voltage signal, the signal amplitude corresponding to operating voltage $U_M$. In the embodiment shown, signal duration "s" of measuring voltage $U_M$ is determined in such a way that precisely one oscillation of the voltage curve of the AC voltage is produced as the measuring signal.

What is claimed is:

1. A method for machining workpieces, comprising
providing a machining electrode which is guided at a specified operating distance to a workpiece,
providing an electrolyte between the workpiece and the machining electrode,
providing an operating current flowing between the machining electrode and the workpiece, which operating current results from an operating voltage ($U_A$), which is produced at the machining electrode in relation to the workpiece, which workpiece is connected to ground, the operating voltage ($U_A$) being applied in such a way that the operating current is a DC current or a pulsed DC current,
superimposing a measuring voltage ($U_M$) on the operating voltage ($U_A$),
detecting a measuring current resulting from the superimposing of the measuring voltage ($U_M$),
determining a distance between the machining electrode and the workpiece from a relationship between the measuring voltage ($U_M$) and the measuring current.

2. The method of claim 1, further comprising regulating a position of the machining electrode relative to the workpiece based on the determined distance, such that the machining electrode is guided at the specified operating distance to the workpiece.

3. The method as recited in claim 1, wherein the measuring voltage ($U_M$) is produced with a predefined periodicity (M).

4. The method as recited in claim 2, wherein the measuring voltage ($U_M$) is a DC voltage.

5. The method as recited in claim 2, wherein the measuring voltage ($U_M$) is a DC voltage, and the application of the measuring voltage causes a voltage between the machining electrode and the workpiece to increase.

6. The method as recited in claim 1, wherein the measuring voltage ($U_M$) is an AC voltage.

7. The method as recited in claim 1, wherein the determining step includes detecting a change in the current through the electrolyte to the workpiece which results from the measuring voltage ($U_M$) and deriving a value for the distance between the machining electrode and the workpiece therefrom.

8. The method as recited in claim 7, wherein the relationship between the measuring current resulting from the application of the measuring voltage ($U_M$) and the distance of the machining electrode and the workpiece is stored in an empirically established table.

9. The method as recited in claim 1, further comprising regulating the operating voltage based on the relationship between the measuring voltage ($U_M$) and the measuring current.

10. The method as recited in claim 6, wherein a signal duration "s" of the measuring voltage ($U_M$) corresponds to one voltage oscillation.

* * * * *